*US009370855B2*

(12) United States Patent
Ohishi et al.

(10) Patent No.: US 9,370,855 B2
(45) Date of Patent: Jun. 21, 2016

(54) STRUCTURED ABRASIVE ARTICLES AND METHOD OF MANUFACTURING THE SAME

(75) Inventors: Michihiro Ohishi, Sagamihara (JP); Yoko Nakamura, Hachioji (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/123,790

(22) PCT Filed: Jun. 25, 2012

(86) PCT No.: PCT/US2012/043927
§ 371 (c)(1),
(2), (4) Date: Dec. 4, 2013

(87) PCT Pub. No.: WO2013/003252
PCT Pub. Date: Jan. 3, 2013

(65) Prior Publication Data
US 2014/0109489 A1     Apr. 24, 2014

(30) Foreign Application Priority Data
Jun. 27, 2011   (JP) ................................ 2011-142022

(51) Int. Cl.
*B24D 3/28* (2006.01)
*C09K 3/14* (2006.01)
*B24D 18/00* (2006.01)

(52) U.S. Cl.
CPC .............. *B24D 3/28* (2013.01); *B24D 18/0009* (2013.01); *C09K 3/1409* (2013.01)

(58) Field of Classification Search
CPC ............ B24D 3/00; B24D 11/04; B24D 5/00; B24D 7/00; C09K 3/14; C09G 1/00; C09G 1/02
See application file for complete search history.

(56) References Cited

U.S. PATENT DOCUMENTS

| 5,213,591 | A | 5/1993 | Celikkaya |
| 5,437,754 | A * | 8/1995 | Calhoun .............. B24D 11/005 156/231 |
| 6,165,061 | A | 12/2000 | Fujii |
| 6,217,432 | B1 * | 4/2001 | Woo .............................. 451/534 |
| 6,406,576 | B1 * | 6/2002 | Benedict et al. .............. 156/137 |
| 6,773,475 | B2 * | 8/2004 | Ohishi ............................ 51/298 |
| 2005/0223649 | A1 * | 10/2005 | O'Gary et al. .................. 51/294 |
| 2006/0143991 | A1 | 7/2006 | Sung |
| 2007/0066186 | A1 * | 3/2007 | Annen et al. .................... 451/41 |
| 2009/0241432 | A1 | 10/2009 | Pakusch |

FOREIGN PATENT DOCUMENTS

| JP | 11-333732 | 12/1999 |
| JP | 2008-290233 | 12/2008 |
| WO | 92/13680 | 8/1992 |

(Continued)

OTHER PUBLICATIONS

Kovalchuk, "Principles of design and production technology of abrasive and diamond tool" (1984).

*Primary Examiner* — Pegah Parvini
*Assistant Examiner* — Alexandra M Moore
(74) *Attorney, Agent, or Firm* — Scott A. Baum; David B. Patchett (57) ABSTRACT

A structured abrasive article having an extensible base member; a three-dimensional element including abrasive particles and binder therefore; and a resin layer that binds the extensible base member and the three-dimensional element.

14 Claims, 5 Drawing Sheets

(56) References Cited

FOREIGN PATENT DOCUMENTS

| WO | WO 02/076678 | 10/2002 |
| WO | WO 03/057410 | 7/2003 |
| WO | 2007/005452 | 1/2007 |
| WO | WO 2010/041815 | 4/2010 |

* cited by examiner

STRUCTURED ABRASIVE ARTICLES AND METHOD OF MANUFACTURING THE SAME

CROSS REFERENCE TO RELATED APPLICATIONS

This application is a national stage filing under 35 U.S.C. 371 of PCT/US2012/043927 filed Jun. 25, 2012, which claims priority to Japanese Patent Application No. 2011-142022, filed Jun. 27, 2011, the disclosures of which are incorporated by reference in their entirety herein.

BACKGROUND

The present invention relates to a structured abrasive article and a method of manufacturing the same.

International Patent Publication No. 2003/057410 discloses an embossed abrasive article, and International Patent Publication No. 2002/076678 and US Patent Application Publication No. 2007/0066186 disclose a flexible abrasive article, as structures for abrasion.

SUMMARY

In order to obtain a structured abrasive article with good abrasive performance with respect to the object to be abraded, good contact with the object to be abraded is required.

One aspect of the present invention relates to a structured abrasive article including: an extensible base member; a three-dimensional element including abrasive particles and binder therefore; and a resin layer that binds the extensible base member and the three-dimensional element.

In one embodiment, the resin layer is a layer made from resin that can be formed in a continuous layer without a supporting core material. In this embodiment, the resin layer is not restricted by the core material, and is capable of bending and extending to follow the extensible base member. Therefore, according to this embodiment, a structured abrasive article can be obtained having excellent contact with objects to be abraded that have irregular or curved surfaces.

In one embodiment, the resin layer is a layer made from resin having an elastic modulus at 25° C. in a range from $1.0\times10^6$ to $1.0\times10^8$ Pa. In this embodiment, the resin is a resin that can bond the extensible base member and the three-dimensional element alone, and the layer made from this resin can bend and extend sufficiently to follow the extensible base member. Therefore, according to this embodiment, a structured abrasive article can be obtained having excellent contact with objects to be abraded that have irregular or curved surfaces.

In one embodiment, the resin layer is tacky at 25° C.

In one embodiment, the resin layer may be bonded with the three-dimensional element and the extensible base member to form a film shape. In this embodiment, because the resin layer can be formed with a constant thickness along the surface shape of the extensible base member, the three-dimensional element formed on this resin layer can be disposed along the surface shape of the extensible base member. Therefore, according to this embodiment, a structured abrasive article can be obtained having excellent contact with objects to be abraded conforming to the surface shape of the extensible base member.

Additionally, one aspect of the present invention relates to a method of manufacturing the structure for abrasion. This method includes a filling step of filling a mold having a plurality of depressions with an abrasive material composition including abrasive particles and a hardening resin; a bonding step of bonding to the resin layer the abrasive material composition filled in the mold; and a hardening step of hardening the abrasive material composition to form on the resin layer the three-dimensional element including the abrasive particles.

Additionally, in another embodiment, the extensible base member may include voids on a surface on a side of the resin layer. These voids may be filled with the resin that constitutes the resin layer. In this embodiment, because the resin layer and the extensible base member are strongly bonded together, peeling of the resin layer from the extensible base member during an abrading process does not occur easily. Therefore, the structured abrasive article according to this embodiment can be used by pressing the structured abrasive article against an object to be abraded and into close contact.

One aspect of the present invention relates to a method of manufacturing the above structure for abrasion. This method of manufacturing includes an application step of applying a hardening resin composition on one surface of the extensible base member so as to fill the voids; a resin layer forming step of forming the resin layer made from the hardened resin composition by hardening the resin composition applied in the application step; a filling step of filling a mold having a plurality of depressions with an abrasive material composition including abrasive particles and a hardening resin; a bonding step of bonding to the resin layer the abrasive material composition filled in the mold; and a hardening step of hardening the abrasive material composition to form on the resin layer the three-dimensional element including the abrasive particles.

One aspect of the present invention relates to another method of manufacturing the above structure for abrasion. This method of manufacturing includes a first filling step of filling an abrasive material composition including abrasive particles and hardening resin into a mold having a plurality of depressions; a second filling step of further filling the mold filled with the abrasive material composition with a hardening resin composition; a bonding step of bonding the resin composition filled in the mold to one surface of the extensible base member, and filling the voids in the extensible base member with the resin composition; and a hardening step of hardening the resin composition and the abrasive material composition, and forming on one surface of the extensible base member the resin layer made from the resin composition and the three-dimensional element including the abrasive particles.

Effect of the Invention

According to the present invention, a structured abrasive article can be provided that can achieve favorable contact with objects to be abraded.

DETAILED DESCRIPTION

Preferred embodiments of the present invention are described below in detail while referring to the drawings, but the present invention is not restricted to the following embodiments. Note that in the following descriptions, identical or similar parts are assigned the same reference number and a duplicate description is omitted.

Figure 1:
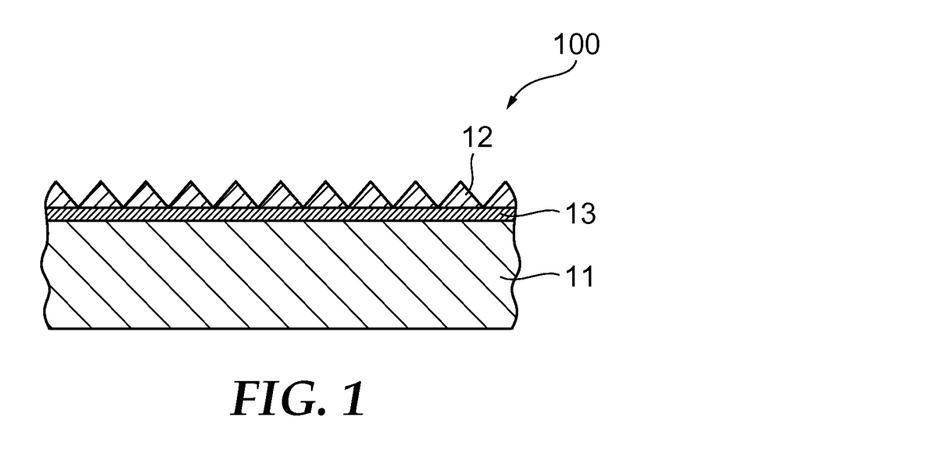
FIG. 1 is a schematic cross-sectional view illustrating an embodiment of the structured abrasive article according to the present invention.

FIG. 1 is a schematic cross-sectional view illustrating an embodiment of a structured abrasive article according to the present invention. A structured abrasive article 100 includes an extensible base member 11, a three-dimensional element 12 including abrasive particles and binder therefore, and a resin layer 13 that binds the extensible base member 11 and the three-dimensional element 12.

The structured abrasive article 100 is used for abrading an object to be abraded using an abrasive surface formed on the three-dimensional element 12.

The extensible base member 11 is a base member having extensibility, and that is capable of deforming in accordance with the shape of the object to be abraded. To have extensibility indicates having an extension of from 10% to 350%, as measured under JISK6275. A rubber base member, a sponge base member, paper, cloth, or the like can be used as the extensible base member 11. A base member made from a rubber component such as, for example, isoprene rubber, butadiene rubber, styrene butadiene rubber, chloroprene rubber, acrylo-nitrile butadiene rubber, butyl rubber, ethylene propylene rubber, urethene rubber, silicone rubber, chlorosulfonated rubber, acrylic rubber, fluorine rubber, or the like, preferably having an extension of from 100% to 200%, can be used as the rubber base member.

Additionally, a base member made from a foam rubber can be used as the rubber base member. The foam rubber can be foam rubber with an open cell structure, a foam rubber with a closed cell structure, or the like.

A base member made from, for example, polyurethane foam, polyethylene foam, melamine foam, or the like, can be used as the sponge base member.

In the structured abrasive article 100, the resin layer 13 is a layer made from resin that can be formed in a continuous layer with or without a core material, but preferably without a core material.

If the resin layer 13 does not have a core material, the resin layer 13 will not be restricted by core material, and will be able to bend and extend sufficiently to follow the extensible base member 11. As a result, the structured abrasive article 100 that includes the resin layer 13 has increasingly excellent contact with objects to be abraded that have irregular or curved surfaces.

Additionally, when the resin layer includes the core material, there is a concern that the core material may become kinked or ruptured due to repeated bending or extension, which would damage the uniformity of the abrasion surface. However, if the resin layer 13 is formed without including the core material, stable abrasion performance can be maintained even with repeated bending and extension.

Additionally, in the structured abrasive article 100, the resin layer 13 is a layer made from resin with a modulus of elasticity at 25° C. in a range from $1.0 \times 10^6$ to $1.0 \times 10^8$ Pa. This resin can bond the extensible base member 11 and the three-dimensional element 12 alone, and the resin layer 13 can bend and extend sufficiently forming an extensible resin layer to follow the extensible base member 11. As a result, the structured abrasive article 100 including this resin layer 13 has excellent contact with objects to be abraded that have irregular or curved surfaces.

Additionally, in the structured abrasive article 100, the resin layer 13 bonds the extensible base member 11 and the three-dimensional element 12 to form a film shape. This resin layer 13 is formed with a constant thickness along the surface shape of the extensible base member 11, so the three-dimensional element 12 formed on the resin layer 13 is disposed along the surface shape of the extensible base member 11. As a result, the structured abrasive article 100 including this resin layer 13 has excellent contact with objects to be abraded that conform to the surface shape of the extensible base member 11.

Preferably, the resin layer 13 is tacky at 25° C. More preferably, the tackiness of the resin layer 13 is at least No. 5 in a ball tack measurement (in accordance with JIS Z 0237).

The resin constituting the resin layer 13 may be acrylic pressure sensitive adhesive, rubber, silicone, urethane, polyester, or the like, and of these, acrylic pressure sensitive adhesive is preferable.

The resin layer 13 may be formed by applying transfer tape, which includes a support member and a pressure sensitive adhesive layer made from acrylic pressure sensitive adhesive provided on the support member, onto the extensible base member 11, and peeling off the support member to transfer the pressure sensitive adhesive layer onto the extensible base member 11.

In the structured abrasive article 100, the three-dimensional element 12 includes abrasive particles for abrading the objects to be abraded, and binder that binds the abrasive particles.

Examples of abrasive particles include diamond, cubic boron nitride, cerium oxide, fused aluminum oxide, heat treated aluminum oxide, aluminum oxide derived by a sol-gel method, silicon carbide, chromium oxide, silica, zirconia, alumina zirconia, iron oxide, garnet, and the like, and mixtures thereof.

The dimensions of the abrasive particles vary depending on the type of abrasive particle or the abrasion application. For example, the dimensions for final finish abrasion are preferably from 0.01 to 2 μm, more preferably from 0.01 to 0.5 μm, and still more preferably from 0.01 to 0.1 μm, and for rough abrasion preferably from 0.5 to 100 μm, and more preferably from 0.5 to 50 μm.

The binder is a matrix in which the abrasive particles are dispersed, and includes, for example, phenol resin, aminoplast resin, urethane resin, epoxy resin, acrylate resin, acrylated isocyanurate resin, urea-formaldehyde resin, isocyanurate resin, acrylated urethane resin, acetylated epoxy resin, or mixtures thereof and the like.

In FIG. 1, the three-dimensional element 12 is illustrated as a triangular shape in cross-section, but the shape of the three-dimensional element 12 is not necessarily limited to this. The shape of the three-dimensional element 12 can be selected as appropriate from known shapes in accordance with the type of objects to be abraded or the abrasion application.

Additionally, the three-dimensional element 12 may have a multi-layer structure. Specifically, the three-dimensional element 12 may have an abrasive material layer made from abrasive particles and binder therefore, and a support layer that supports the abrasive material layer, similar to the three-dimensional element 42 in the structured abrasive article 120 illustrated in FIG. 4 and which is described later, for example.

The structured abrasive article 100 includes a plurality of three-dimensional elements 12. The shapes of the plurality of three-dimensional elements 12 may each be different or they may be the same.

In the structured abrasive article 100, preferably each one of the plurality of three-dimensional elements 12 is independently connected to the resin layer 13. Such a structured abrasive article 100 can easily bend and extend compared with the case where the plurality of three-dimensional elements 12 are formed integrally, so it is difficult to damage the three-dimensional element 12 due to bending and extension.

Figure 2:
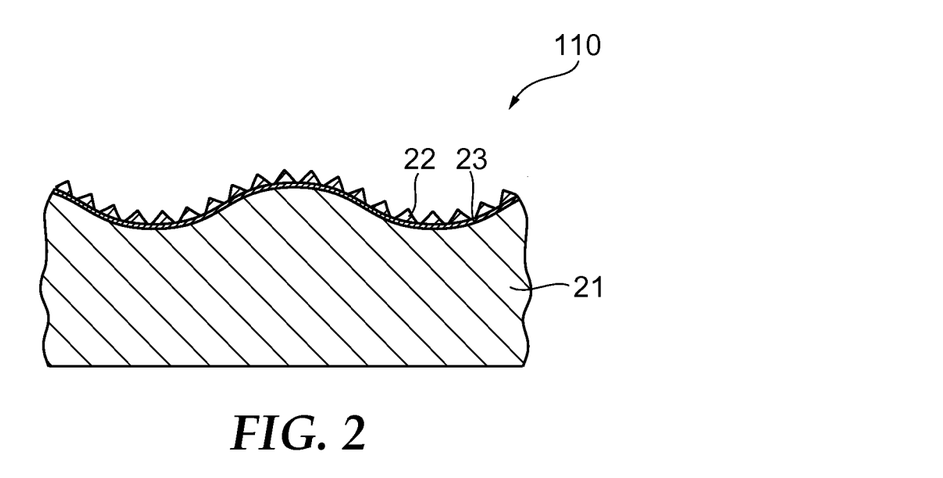
FIG. 2 is a schematic cross-sectional view illustrating an embodiment of the structured abrasive article according to the present invention.

Next, a structured abrasive article 110 illustrated in FIG. 2 is explained. FIG. 2 is a schematic cross-sectional view illustrating an embodiment of the structured abrasive article according to the present invention. The structured abrasive article 110 includes an extensible base member 21, a three-dimensional element 22 including abrasive particles and binder therefore, and a resin layer 33 that binds the extensible base member 21 and the three-dimensional element 22. In the following explanation, the explanations of the parts that duplicate those of the extensible base member 11, three-dimensional element 12, and resin layer 13 of the structured abrasive article 100 are omitted.

In the structured abrasive article 110, the extensible base member 21 has a wavy surface, and the resin layer 23 is formed along this wavy surface.

The shape of the surface of the extensible base member 21 can be selected as appropriate from known shapes in accordance with the type of objects to be abraded or the abrasion application. For example, when the object to be abraded has a curved surface, the wavy surface of the extensible base member 21 can conform to this curved surface. As a result, the structured abrasive article 110 has increasingly excellent contact with objects to be abraded having irregular or curved surfaces.

FIGS. 3a-d illustrate embodiments of the method of manufacturing the structured abrasive article according to the present invention.

The method of manufacturing according to the present embodiment includes a filling step of filling a mold 35 having a plurality of depressions with an abrasive material composition 37 including abrasive particles and hardening resin; a bonding step of bonding to a resin layer 33 the abrasive material composition 37 with which the mold 35 has been filled; and a hardening step of hardening the abrasive material composition 37 to form a three-dimensional element 32 including the abrasive particles on the resin layer 33.

Figure 3A:
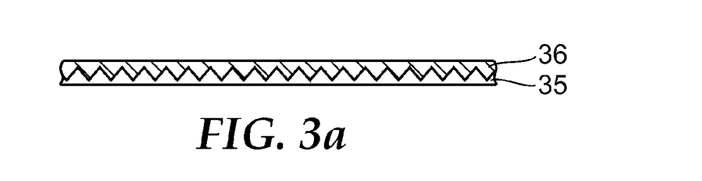
FIGS. 3a-d illustrate embodiments of a method of manufacturing the structured abrasive article according to the present invention.
Figure 3B:
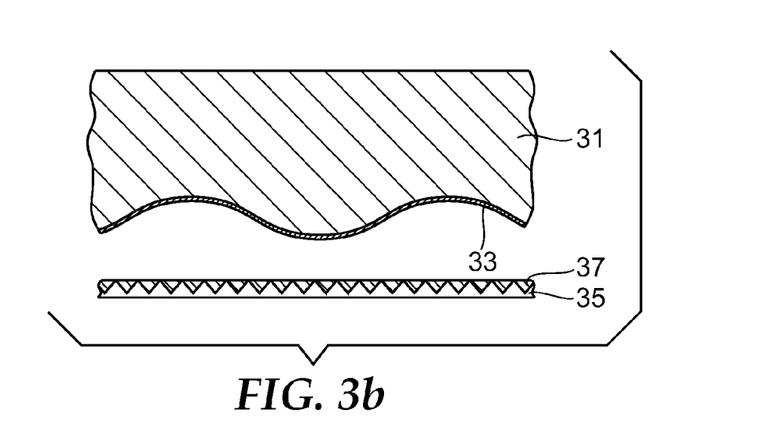

As illustrated in FIG. 3b, in the filling step, the mold 35 is filled with the abrasive material composition 37. A mold having depressions corresponding to the shape of the desired three-dimensional element 32 is selected as the mold 35. There is no particular limitation on the material or the like of the mold 35, and for example, a film shaped polypropylene mold or the like can be used.

The abrasive material composition 37 is a composition for forming the hardened three-dimensional element 32 in the hardening step, and includes abrasive particles and hardening resin. Here, the hardening resin is the component that forms the binder in the hardening step described above.

The filling step is a step of filling the mold 35 with the abrasive material composition 37 as illustrated in FIG. 3a, and may include, for example, a step of filling the mold 35 with an abrasive material application liquid 36 including abrasive particles, hardening resin, and solvent; and a step of removing at least a part of the solvent from the abrasive material application liquid 36 with which the mold 35 is filled. According to the filling step, the depressions of the mold 35 can be uniformly filled with the abrasive material composition 37.

The solvent may be an alcohol-type such as isopropanol, a ketone-type such as methyl ethyl ketone, an aromatic-type such as toluene, an ether-type such as propylene glycol monomethyl ether, an ester-type such as acetic ether, or the like. The solvent can be removed by, for example, evaporating solvent by heating.

In the bonding step, the abrasive material composition 37 with which the mold 35 has been filled in the filling step is bonded to the resin layer 33. In the method of manufacturing illustrated in FIGS. 3a-d, an extensible base member 31 is applied to a first surface of the resin layer 33. In other words, the bonding step can be a step of bonding the abrasive material composition 37 to a second surface side of the resin layer 33 that has the extensible base member 31 applied to the first surface.

Herein, the case in which the extensible base member 31 has a wavy surface has been described, but the surface shape of the extensible base member 31 does not limit the method of manufacturing according to the present embodiment.

Figure 3C:
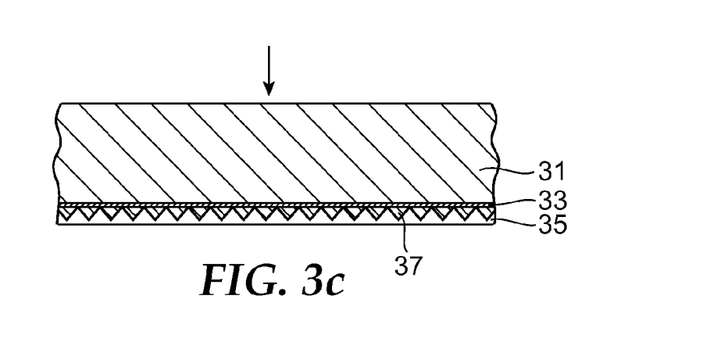

The resin layer 33 is formed along the surface shape of the extensible base member 31. Therefore in the bonding step, to ensure close contact between the resin layer 33 and the mold 35, it is desirable that the extensible base member 31 and the resin layer 33 be pressed into the mold 35, as illustrated in FIG. 3c. Pressing can be carried out using an autoclave, for example. In this case, the abrasive material composition 37 may be one that is already hardened.

In the hardening step, the abrasive material composition 37 is hardened with the extensible base member 31 and the resin layer 33 pressed into the mold 35, and the three-dimensional element 32 is formed on the resin layer 33.

The method of hardening the abrasive material composition 37 can be selected as appropriate in accordance with the type of hardening resin contained in the abrasive material composition 37 and the like. For example, there is the method of hardening by heating, the method of hardening by irradiation with light, the method of hardening by both heating and irradiation with light, and the like.

Figure 3D:
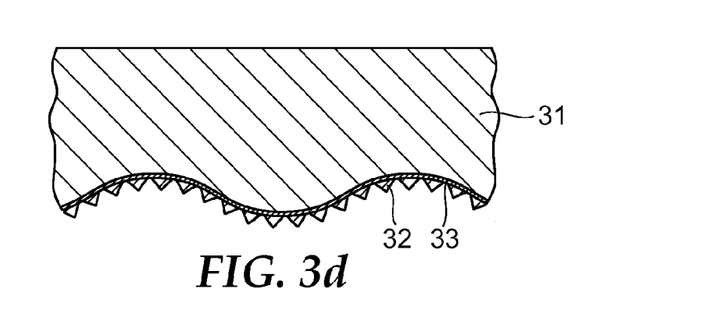

After the hardening step, by removing the mold 35, the structured abrasive article including the extensible base member 31, the resin layer 33, and the three-dimensional element 32 is obtained, as illustrated in FIG. 3d.

In the above embodiment, the bonding step was the step of bonding the abrasive material composition 37 to the second surface side of the resin layer 33 that has the extensible base member 31 applied to the first surface, but the bonding step may also be a step of bonding the abrasive material composition 37 to a resin layer 33 to which the extensible base member 31 has not been applied. In this case, after the hardening step, an application step of applying the extensible base member 31 to a second surface side of a resin layer 33 that has the three-dimensional element 32 formed on a first side can be further provided.

Figure 4:
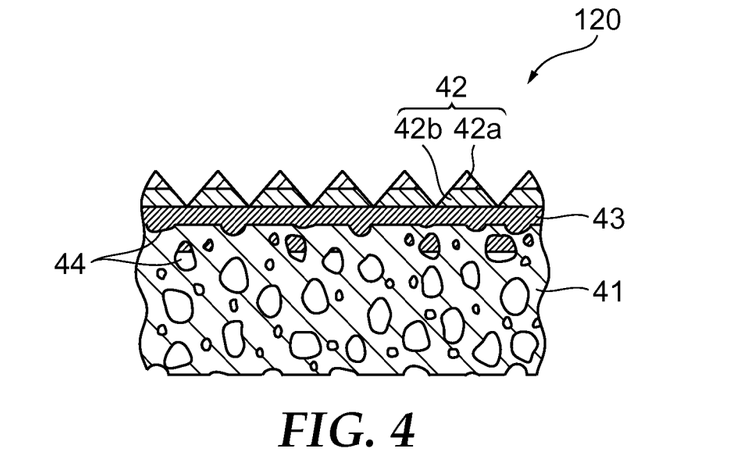
FIG. 4 is a schematic cross-sectional view illustrating an embodiment of the structured abrasive article according to the present invention.

Next, a structured abrasive article 120 illustrated in FIG. 4 is explained. FIG. 4 is a schematic cross-sectional view illustrating an embodiment of the structured abrasive article according to the present invention.

The structured abrasive article 120 includes an extensible base member 41, a three-dimensional element 42 including abrasive particles and binder therefore, and a resin layer 43 that binds the extensible base member 41 and the three-dimensional element 42.

In the structured abrasive article 120, the extensible base member 41 has voids 44 on a surface on the resin layer 43 side, and at least some of the voids 44 are filled with the resin that constitutes the resin layer 43. In this structured abrasive article 120, the resin layer 43 and the extensible base member 41 are strongly joined, so it is difficult to peel the resin layer 43 from the extensible base member 41 in the abrading process. Therefore, it is possible to press the structured abrasive article 120 more strongly toward the objects to be abraded to obtain close contact during use.

The extensible base member 41 is a base member having extensibility that is capable of deforming in accordance with the shape of the object to be abraded, and has voids 44 at least on the surface on the side of the resin layer 43. Preferably, a foam rubber base member, a sponge base member, or the like is used as the extensible base member 41.

It is desirable that resin having good affinity for the material that constitutes the extensible base member 41 be selected as the resin constituting the resin layer 43. In other words, if for example the extensible base member 41 is polyurethane foam, then it is desirable that the resin layer 43 contains resin having a urethane bond. As a result, the bond between the resin layer 43 and the extensible base member 41 becomes even stronger.

In the structured abrasive article 120, the side of the resin layer 43 on which the three-dimensional element 42 is formed is a smooth surface regardless of the shape of the surface of the extensible base member 41. Therefore, a uniform abrasion surface is formed in the structured abrasive article 120 by the three-dimensional element 42 that is formed on the resin layer 43, and the structured abrasive article 120 has good contact with objects to be abraded having a planar shape.

Preferably, the resin layer 43 does not include a core material such as a polyurethane film. If the resin layer includes the core material, when damage occurs to a part of the resin layer during abrasion processes, there is a concern that the core material at the damaged part will peel from the resin layer outside the damaged part, causing continuous use to be difficult. In contrast, when there is no core material in the resin layer 43, even if damage occurs to a part of the resin layer 43, peeling is limited to the damaged part, and it is possible to continue abrading in the part outside the damaged part.

The three-dimensional element 42 includes abrasive particles and binder therefore. An example of the abrasive particles and binder is the same abrasive particles and binder as in the three-dimensional element 12.

In FIG. 4, a plurality of three-dimensional elements 42 are shown each independently formed on the resin layer 43, but the three-dimensional element 42 may be formed integrally in the structured abrasive article 120.

In the structured abrasive article 120, the three-dimensional element 42 can have an abrasive material layer 42a made from abrasive particles and binder therefore, and a support layer 42b bonded to the resin layer 43 that supports the abrasive material layer 42a, and the support layer 42b is, for example, a layer made from hardened acrylic adhesive.

When the support layer 42b is a layer made from hardened acrylic adhesive, preferably the resin layer 43 includes acrylic resin. As a result, the bond between the support layer 42b and the resin layer 43 becomes even stronger.

In other words, in an example of preferred composition of the structured abrasive article 120, the extensible base member 41 is polyurethane foam, the resin layer 43 includes acrylic resin having a urethane bond, and the support layer 42b of the three-dimensional element 42 is a layer made from hardened acrylic adhesive.

In the structured abrasive article 120, the three-dimensional element 42 may have a single layer structure including abrasive particles and binder therefore, similar to the three-dimensional element 12 as described above.

FIGS. 6a-d illustrate embodiments of a method of manufacturing the structured abrasive article 120. The method of manufacturing according to the present embodiment includes an application step of applying a hardening resin composition 66 on one surface of an extensible base member 61 so as to fill voids 64; a resin layer forming step of forming a resin layer 63 made from the hardened resin composition 66 by hardening the resin composition 66 applied in the application step; a filling step of filling an abrasive material composition 67 including abrasive particles and hardening resin into a mold 65 having a plurality of depressions; a bonding step of bonding the abrasive material composition 67 with which the mold 65 has been filled to a resin layer 63; and a hardening step of hardening the abrasive material composition 67 to form a three-dimensional element 62 including the abrasive particles on the resin layer 63.

Figure 6A:
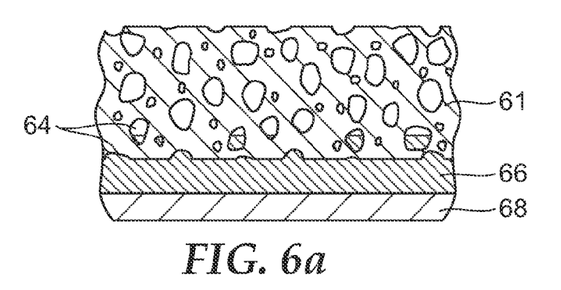
FIGS. 6a-d illustrate embodiments of the method of manufacturing the structured abrasive article according to the present invention.

In the application step, for example, the extensible base member 61 can be laminated on the hardening resin composition 66 that is applied on a support film 68 such as polyester film or the like, as illustrated in FIG. 6a. At this time, by appropriately adjusting the lamination pressure, the resin composition 66 fills the voids 64 of the extensible base member 61.

The support film 68 is preferably a film to which a peel treatment has been applied, so that it can be easily peeled off after the resin layer forming step. Additionally, the support film 68 is preferably transparent to light, to enable hardening by light irradiation in the resin layer forming step.

Figure 6B:
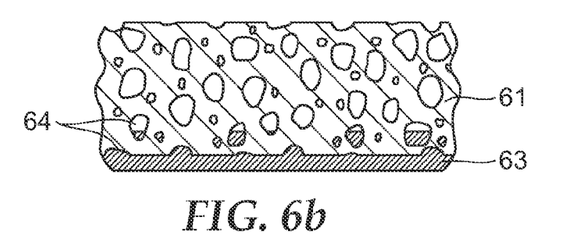

In the resin layer forming step, the shape of a surface of the resin layer 63 on the opposite side of the extensible base member 61 (the surface on the side on which the three-dimensional element 62 is formed) reflects the surface shape of the support film 68. Therefore, a support film having a smooth surface is preferably used as the support film 68.

The resin composition 66 is a composition for forming the resin layer 63 by hardening. The resin composition 66 can include, for example, acrylic monomer having a hydroxyl group, a urethane prepolymer, and a polymerization initiator. According to this resin composition 66, the resin layer 63 including acrylic resin having a urethane bond is formed.

The acrylic monomer having a hydroxyl group may be epoxy (meta)acrylate, caprolactone (meta)acrylate, tris(2-hydroxyethyl)isocyanurate di(meta)acrylate, hydroxyethyl (meta)acrylate, hydroxybutyl (meta)acrylate, hydroxypropyl (meta)acrylate, dipentaerythritol monohydroxy penta (meta) acrylate, or the like.

The urethane prepolymer is a compound having two or more isocyanate groups. The urethane prepolymer can be, for example, tolylene diisocyanate, diphenyl methane diisocyanate, hexamethylene diisocyanate, isophorone diisocyanate, dicyclohexyl methane diisocyanate, triphenyl methane triisocyanate, and other polyfunctional isocyanates, and these together with a urethane oligomer having an isocyanate group at the end such as (poly)ethylene glycol, (poly)propylene glycol, (poly)tetramethylene glycol, polycaprolactone diol, polycarbonate diol, polyester polyol, trimethylol propane, and other products of reaction with polyol.

As the polymerization initiator, 2,2-dimethoxy-1,2-diphenylethan-1-one, 1-hydroxy-cyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-methyl-1-(4-methylthiophenyl)-2-morpholino-propane-1-one, 2-benzyl-2-dimethylamino-1-(4-morpholino-phenyl)-butanone-1,2-(dimethyl amino)-2-[(4-methyl phenyl)methyl]-1-[4-(4-morpholinyl)phenyl]-1-butanone, 2,4,6-trimethyl benzoyl-diphenyl-phosphine oxide, bis(2,4,6-trimethyl benzoyl-phenyl-phosphine oxide, 2-isopropyl thioxanthone, benzophenone, and the like can be used.

In the resin layer forming step, the resin composition 66 is hardened to form the resin layer 63 from the hardened resin composition 66. There is no particular limitation on the method of hardening the resin composition 66, and for example, hardening can be carried out by light irradiation from the support film 68 side.

Figure 6C:
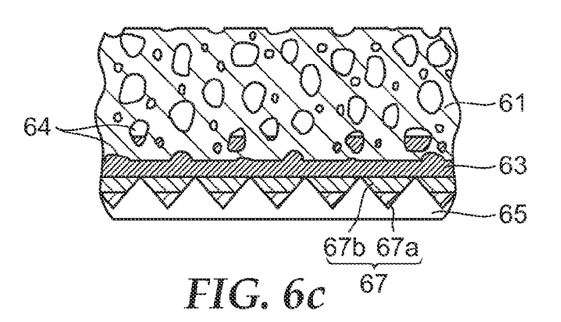

In the filling step, the depressions of the mold 65 are filled with the abrasive material composition 67 including abrasive particles and hardening resin, as illustrated in FIG. 6c. In the method of manufacturing according to the present embodiment, the abrasive material composition 67 is filled into the depressions of the mold 65 so that a first layer 67a including abrasive particles and a second layer 67b provided on the first layer 67a are formed.

The first layer 67a is a layer that forms an abrasive material layer 62a including abrasive particles, and the second layer 67b is a layer that is bonded to the resin layer 63, supports the abrasive material layer 62a, and forms a support layer 62b.

In the hardening step, the first layer 67a can form the binder in the abrasive material layer 62a as a result of the hardening, and may include a first hardening resin. Additionally, the first hardening resin of the first layer 67a may already be hardened prior to the hardening step.

The second layer 67b is hardened in the hardening step, and includes a second hardening resin. The second hardening resin is the component that forms the support layer described above as a result of the hardening step, and is preferably an acrylic adhesive.

Here, the method of forming the first layer 67a and the second layer 67b can be a method including a first application liquid filling step of filling the mold 65 with abrasive material layer application liquid including abrasive particles, the first hardening resin, and solvent; a solvent removal step of removing at least a part of the solvent from the abrasive material layer application liquid filled in the mold 65; and a second application liquid filling step of further filling the mold 65 that has passed through the solvent removal step with support layer application liquid including the second hardening resin. Additionally, a primary hardening step of hardening the first hardening resin may be provided between the solvent removal step and the second application liquid filling step.

In the bonding step, the resin layer 63 is bonded to the abrasive material composition 67 that has been filled in the mold 65, as illustrated in FIG. 6c. Then, in the hardening step, the abrasive material composition 67 is hardened, and the three-dimensional element 62 including abrasive particles is formed on the resin layer 63.

Figure 6D:
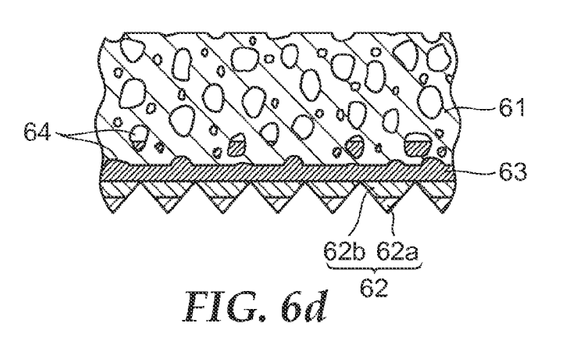

The method of hardening the abrasive material composition 67 can be selected as appropriate in accordance with the type of hardening resin included in the abrasive material composition 67 (the first hardening resin and/or the second hardening resin), for example, the method of hardening by heating, the method of hardening by irradiation with light, the method of hardening by combined heating and irradiation with light, and the like.

As stated above, in the method of manufacturing according to the present embodiment, in the resin layer forming step, the shape of the surface of the resin layer 63 on the opposite side to the extensible base member 61 (the surface on the side on which the three-dimensional element 62 is formed) reflects the shape of the surface of the support film 68. In other words, in the method of manufacture according to the present embodiment, the resin layer 63 is formed having a smooth surface, regardless of the shape of the surface of the extensible base member 61. Therefore a uniform abrasion surface is formed on the structured abrasive article manufactured by the method of manufacture according to the present embodiment by the three-dimensional element 62 formed on the smooth surface of the resin layer 63, and it has good contact with objects to be abraded having a planar surface.

Figure 5:
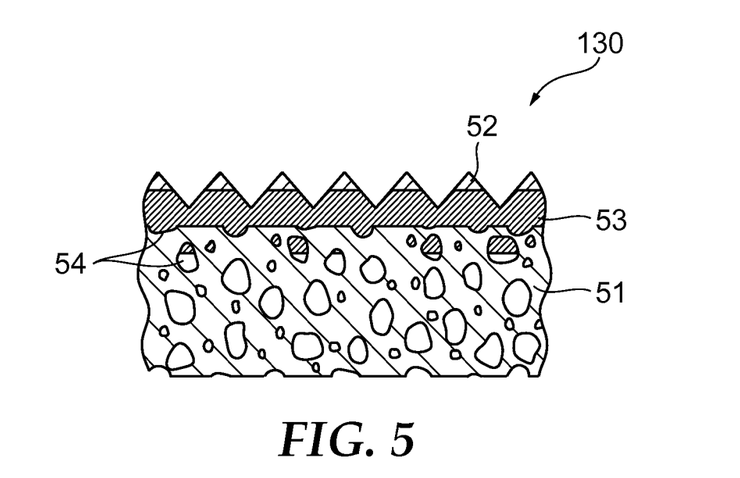
FIG. 5 is a schematic cross-sectional view illustrating an embodiment of the structured abrasive article according to the present invention.

Next, a structured abrasive article 130 illustrated in FIG. 5 is explained. FIG. 5 is a schematic cross-sectional view illustrating an embodiment of the structured abrasive article according to the present invention.

A structured abrasive article 130 includes an extensible base member 51, a three-dimensional element 52 including abrasive particles and binder therefore, and a resin layer 53 that binds the extensible base member 51 and the three-dimensional element 52. The extensible base member 51 has voids 54 on the surface on the resin layer 53 side, and at least some of the voids 54 are filled with the resin that constitutes the resin layer 53. In the following explanation, the explanations of the parts that duplicate those of the extensible base member 41, three-dimensional element 42, and resin layer 43 of the structured abrasive article 120 are omitted.

In the structured abrasive article 130, the resin layer 53 is bonded to the extensible base member 51 on the first surface side, and is integral with the three-dimensional element 52 on the second surface side, forming a three-dimensional shape.

The resin layer 53 in the structured abrasive article 130 is preferably a layer made from hardened adhesive, and more preferably is a layer made from hardened acrylic adhesive.

Additionally, it is desirable that resin having good affinity for the material that constitutes the extensible base member 51 be selected as the resin constituting the resin layer 53. In other words, if for example the extensible base member 51 is polyurethane foam, then it is desirable that the resin layer 53 contains resin having a urethane bond. As a result, the bond between the resin layer 53 and the extensible base member 51 becomes even stronger.

The resin layer 53 is preferably a layer made from hardened acrylic adhesive including an acrylic monomer having a hydroxyl group, a urethane prepolymer, and a polymerization initiator. Such hardened acrylic adhesive has a urethane bond, and has excellent affinity for polyurethane foam.

The acrylic monomer having a hydroxyl group may be epoxy (meta)acrylate, caprolactone (meta)acrylate, tris(2-hydroxyethyl)isocyanurate di(meta)acrylate, hydroxyethyl (meta)acrylate, hydroxybutyl (meta)acrylate, hydroxypropyl (meta)acrylate, dipentaerythritol monohydroxy penta (meta)acrylate, and the like.

Additionally, the urethane prepolymer can be, for example, tolylene diisocyanate, diphenyl methane diisocyanate, hexamethylene diisocyanate, isophorone diisocyanate, dicyclohexyl methane diisocyanate, triphenyl methane triisocyanate, and other polyfunctional isocyanates, and these together with a urethane oligomer having an isocyanate group at the end such as (poly)ethylene glycol, (poly)propylene glycol, (poly)tetramethylene glycol, polycaprolactone diol, polycarbonate diol, polyester polyol, trimethylol propane, and other products of reaction with polyol.

Moreover, as the polymerization initiator, 2,2-dimethoxy-1,2-diphenylethane-1-one, 1-hydroxy-cyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-methyl-1-(4-methylthiophenyl)-2- morpholino-propane-1-one, 2-benzyl-2-dimethylamino-1-(4-morpholino-phenyl)-butanone-1,2-(dimethyl amino)-2-[(4-methyl phenyl)methyl]-1-[4-(4-morpholinyl)phenyl]-1-butanone, 2,4,6-trimethyl benzoyl-diphenyl-phosphine oxide, bis(2,4,6-trimethyl benzoyl-phenyl-phosphine oxide, 2-isopropyl thioxanthone, benzophenone, and the like can be used.

FIGS. 7a-e illustrate embodiments of a method of manufacturing the structured abrasive article 130. The method of manufacturing according to the present embodiment includes a first filling step of filling an abrasive material composition 77 including abrasive particles and hardening resin into a mold 75 having a plurality of depressions; a second filling step of further filling the mold 75 that has been filled with the abrasive material composition 77 with a hardening resin composition 78; a bonding step of bonding the resin composition 78 that has been filled in the mold 75 to one surface of an extensible base member 71 and filling voids 74 in the extensible base member 71 with the resin composition 78; and a hardening step of hardening the resin composition 78 and the abrasive material composition 77, and forming on one surface of the extensible base member 71 a resin layer 73 made from hardened resin composition 78 and a three-dimensional element 72 including the abrasive particles.

Figure 7A:
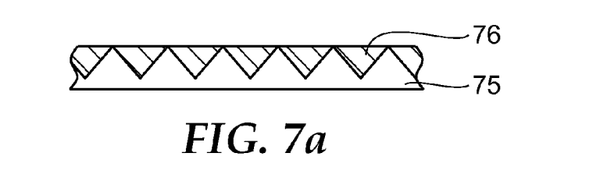
FIGS. 7a-e illustrate embodiments of the method of manufacturing the structured abrasive article according to the present invention.
Figure 7B:
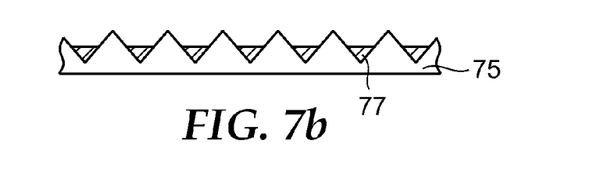

In the first filling step, the mold 75 is filled with abrasive material composition 77, as illustrated in FIG. 7b. In the method of manufacturing illustrated in FIGS. 7a-e, the mold 75 is filled with abrasive material composition 77 by a method including an application liquid filling step of filling the mold 75 with an abrasive material application liquid 76 including abrasive particles, hardening resin, and solvent; and a solvent removal step of removing at least a part of the solvent from the abrasive material application liquid 76 with which the mold 75 has been filled. In the first filling step, a provisional hardening step of provisionally hardening the abrasive material composition 77 may be additionally carried out after the solvent removal step.

Figure 7C:
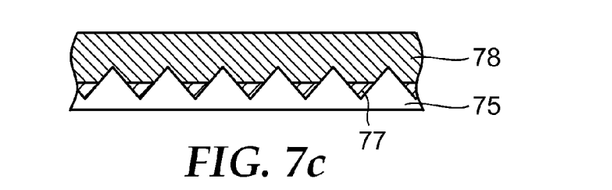

In the second filling step, the mold 75 that has been filled with the abrasive material composition 77 is further filled with the hardening resin composition 78, as illustrated in FIG. 7c.

The resin composition 78 is hardened to constitute the resin layer 73, and is preferably an acrylic adhesive, and more preferably is an acrylic adhesive including an acrylic monomer having a hydroxyl group, a urethane prepolymer, and a polymerization initiator. In the bonding step, preferably the resin composition 78 is in liquid form, so that the voids 74 are easily filled with resin composition 78.

Figure 7D:
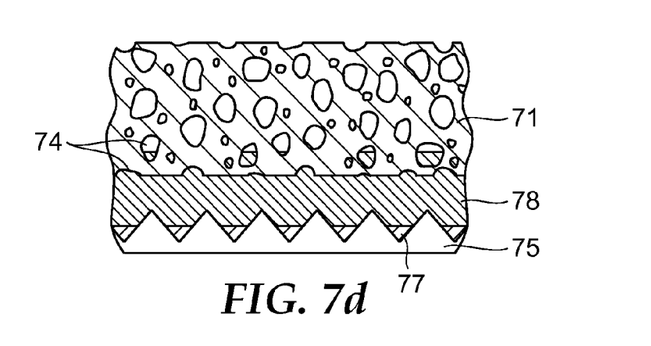

In the bonding step, the resin composition 78 with which the mold 75 has been filled and the extensible base member 71 are bonded, as illustrated in FIG. 7d. At this time, by appropriately adjusting the bonding pressure, the resin composition 78 sufficiently fills the voids 74 of the extensible base member 71.

Figure 7E:
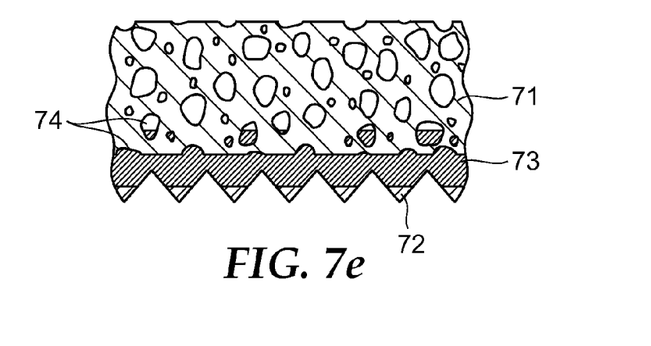

The hardening step is a step in which the resin composition 78 and the abrasive material composition 77 are hardened, and the resin layer 73 and the three-dimensional element 72 are formed on one side of the extensible base member 71, as illustrated in FIG. 7e.

The method of hardening the resin composition 78 and the abrasive material composition 77 can be selected as appropriate in accordance with the type of hardening resin contained in the resin composition 78, the abrasive material composition 77, and the like, for example there is the method of hardening by heating, the method of hardening by irradiation with light, the method of hardening by both heating and irradiation with light, and the like.

In the method of manufacturing according to the present embodiment, the shape of the surface of the resin layer 73 on the opposite side to the extensible base member 71 (the surface on the side on which the three-dimensional element 72 is formed) is a shape that reflects the shape of the mold 75. Therefore, according to the method of manufacture of the present embodiment, a structured abrasive article having a uniform abrasion surface is formed, regardless of the shape of the surface of the extensible base member 61. This structured abrasive article has good contact with objects to be abraded having a planar surface.

In the above, the preferred embodiments of the present invention were explained, but the present invention is not limited to these embodiments.

WORKING EXAMPLES

The present invention will be explained in further detail below based on working examples, but the present invention is not limited to the following working examples.

Working Example 1

Manufacture of a Mode of Structured Abrasive Article 100

A sponge base member (PORON H-32, manufactured by INOAC Foam Company, extension of 155% according to JISK6251) was selected as the extensible base member and a transfer tape (468 MP, manufactured by 3M Company) having a layer made from acrylic adhesive was selected as the transfer tape. This transfer tape is a tape including a liner layer and a resin layer (layer made from acrylic adhesive). The transfer tape was laminated onto the sponge base member, after which the liner was peeled off, transferring the resin layer to the sponge base member.

An abrasive material application liquid was prepared by mixing 25.9 parts by weight of phenol resin as a hardening resin, 44.5 parts by weight of diamond particles as abrasive particles, and 29.6 parts by weight of isopropanol as a solvent. The prepared abrasive material application liquid was applied to a polypropylene mold film (also referred to as tooling film or forming film) using a comma coater. Next, the abrasive material application liquid was dried by evaporating the isopropanol in an oven at 100° C., and the mold film was filled with an abrasive material composition.

The sponge base member onto which the resin layer was transferred was laminated onto the mold film that was filled with the abrasive material composition. After lamination, the abrasive material composition was hardened by heating to 90° C. in an oven for 24 hours, and an adhesive layer and the abrasive material composition were bonded.

The mold film was peeled; heating was carried out for a further 24 hours at 110° C. in an oven, and the abrasive material composition was further hardened. In this way, a structured abrasive article was obtained that included the sponge base member, the three-dimensional element made from the hardened abrasive material composition, and the resin layer that bonded these.

The structured abrasive article obtained could be easily bent and extended, and exhibited excellent contact to objects to be abraded having irregular or curved surfaces. Additionally, the abrasive surface could not be easily kinked or ruptured even when bent or extended, and easily returned to the original shape, and therefore was capable of being repeatedly used on diverse objects to be abraded.

Working Example 2

Manufacture of a Mode of Structured Abrasive Article 110

A sponge base member (manufactured by 3M Company) having a wavy surface was selected as the extensible base member, transfer tape (manufactured by 3M Company, 468 MP) having a layer made from acrylic adhesive was selected as the transfer tape, the transfer tape was laminated onto the sponge base member, and the resin layer (layer made from acrylic pressure sensitive adhesive) was transferred to the sponge base member.

The abrasive material application liquid was prepared by mixing trimethylol propane triacrylate (SR351S manufactured by Sartomer) 70 parts by weight, tris(2-hydroxyethyl) isocyanurate triacrylate (manufactured by To a Gosei Co., Ltd., Aronix M-315) 30 parts by weight, 3-methacryloxypropyl trimethoxy silane (manufactured by Shinetsu Silicone, KBM-503) 3.6 parts by weight, photocuring agent (manufactured by Ciba Japan, Irgacure 369) 1.8 parts by weight, aluminum oxide (Nanko Abrasives Industry Co., Ltd., A 800) 347.0 parts by weight as the abrasive particles, and polypropylene glycol monomethyl ether 193.9 parts by weight as the solvent. The prepared abrasive material application liquid was applied to a polypropylene mold film using a comma coater. Next, the abrasive material application liquid was dried by evaporating the polypropylene glycol monomethyl ether in an oven at 70° C., the mold film was filled with the abrasive material composition, and the abrasive material composition was hardened by UV irradiation.

The sponge base member onto which the resin layer had been transferred was placed on the mold film that was filled with the abrasive material composition, and this unit was sandwiched between metal plates and pressed with a vise. In this state, the unit was hot pressed for 30 minutes at 50° C. in an autoclave. Next, the vise, the metal plates, and the mold film were removed, and the structured abrasive article that included the sponge base member, the three-dimensional element made from the hardened abrasive material composition, and the resin layer that bonds these together was obtained.

In the structured abrasive article obtained, the resin layer and the three-dimensional element were formed following the wavy surface of the sponge base member, and the abrasive surface was obtained following the surface shape of the sponge base member. This structured abrasive article exhibited excellent contact with objects to be abraded that conformed to the surface shape of the sponge base member. Additionally, the abrasive surface could not be easily kinked or ruptured even when bent or extended, and easily returned to the original shape, and therefore was capable of being repeatedly used on diverse objects to be abraded.

Working Example 3

Manufacture of a Mode of Structured Abrasive Article 120

A hardening resin composition with the composition shown in Table 1 was applied using a knife coater to a polyester film (Purex film A54-50 µm, manufactured by Teijin Du Pont Films Japan Ltd.) to which a peel treatment was applied, and an applied layer was formed. The quantity applied was 173 g/m². A urethane foam sheet (thickness 6 mm, manufactured by Achilles Japan Inc., mass 320 g/m²) was laminated onto this applied layer, and ultraviolet irradiation was carried out from the polyester film side. In this way, the urethane foam sheet and the hardened hardening resin composition were bonded, and therefore they could be handled as a unit. Next, the hardening resin composition was further hardened by heating for 36 hours at 70° C., and the resin layer was formed.

Next, an abrasive material layer application liquid with the composition shown in Table 2 was prepared, the liquid was applied to a polypropylene mold film using a knife coater, the solvent was removed by drying, ultraviolet irradiation was carried out, and the abrasive material layer was formed in the depressions of the mold film. A support layer application liquid with the composition shown in Table 3 was prepared, and applied on the abrasive material layer in the depressions of the mold film.

Next, the sponge base member on which the resin layer was formed was laminated onto the mold film, heated for 36 hours at 70° C. in an oven, and the support layer application liquid was hardened. Next, the mold film was removed, and the structured abrasive article that included the sponge base member, the resin layer made from the hardened hardening resin composition, and the three-dimensional element made from the abrasive material layer and support layer was obtained.

In the structured abrasive article obtained, the smooth planar shape of the polyester film was transferred to the side of the resin layer on which the three-dimensional element was formed, and therefore the three-dimensional element was precisely formed on the smooth surface of the resin layer. Therefore, the structured abrasive article had good contact with objects to be abraded having a flat surface.

TABLE 1

|  | Quantity (mass ratio) |
|---|---|
| Phenol EO modified acrylate (M-101A, manufactured by Toa Gosei Co., Ltd.) | 60.0 |
| Epoxy acrylate (SP-1509, manufactured by Showa Highpolymer Co., Ltd.) | 40.0 |
| Photoinitiator (Irgacure 907, manufactured by Ciba Japan) | 2.0 |
| Polyether urethane prepolymer (Takenate L-2760, manufactured by Mitsui Chemicals Polyurethanes, Inc.) | 102.3 |

TABLE 2

|  | Quantity (mass ratio) |
|---|---|
| Propylene glycol monomethyl ether | 95.9 |
| Photoinitiator (Irgacure 907, manufactured by Ciba Japan) | 2.47 |
| 3-methacryloyloxypropyl)trimethoxysilane (KMB-503, manufactured by Shinetsu Silicone) | 2.12 |
| 2-phenoxyethyl acrylate (SR 339A, manufactured by Sartomer) | 49.48 |
| Trimethylolpropane triacrylate (SR 351S, manufactured by Sartomer) | 74.23 |
| Aluminum oxide (WA 6000, manufactured by Fujimi Incorporated) | 211.7 |

TABLE 3

| | Quantity (mass ratio) |
|---|---|
| Phenol EO modified acrylate (M-101A, manufactured by Toa Gosei Co., Ltd.) | 60.0 |
| Epoxy acrylate (SP-1509, manufactured by Showa Highpolymer Co., Ltd.) | 40.0 |
| Photoinitiator (Irgacure 907, manufactured by Ciba Japan) | 2.0 |

Working Example 4

Manufacture of a Mode of Structured Abrasive Article 130

An abrasive material application liquid with the composition shown in Table 4 was prepared and the liquid was applied to a polypropylene mold film using a knife coater, the solvent was removed by drying, ultraviolet irradiation was carried out, and the depressions of the mold film were filled with the abrasive material composition. Next, the hardening resin composition with the composition shown in Table 5 was prepared, and applied to the mold film that was filled with the abrasive material composition to form an application layer. The quantity of hardening resin composition applied was about 210 g/m².

A urethane foam sheet (thickness 6 mm, manufactured by Achilles Japan Inc., mass 320 g/m²) was laminated onto the applied layer as a sponge base member, and ultraviolet irradiation was carried out from the mold film side. In this way, the urethane foam sheet and the hardened hardening resin composition and hardened abrasive material composition were bonded, so they could be handled as a unit. Next, the hardening resin composition and abrasive material composition were further hardened by heating for 36 hours at 70° C. Next, the mold film was removed, and the structured abrasive article that included the sponge base member, the resin layer made from the hardened hardening resin composition, and the three-dimensional element made from the hardened abrasive material composition was obtained.

In the structured abrasive article obtained, the shape of the mold film was transferred to the resin layer and the three-dimensional element, and a uniform abrasion surface was formed based on the shape of the mold film. Therefore, the structured abrasive article had good contact with objects to be abraded having a flat surface.

TABLE 4

| | Quantity (mass ratio) |
|---|---|
| Propylene glycol monomethyl ether | 95.9 |
| Photoinitiator (Irgacure 907, manufactured by Ciba Japan) | 2.47 |
| 3-methacryloyloxypropyl)trimethoxysilane (KMB-503, manufactured by Shinetsu Silicone) | 2.12 |
| 2-phenoxyethyl acrylate (SR 339A, manufactured by Sartomer) | 49.48 |
| Trimethylolpropane triacrylate (SR 351S, manufactured by Sartomer) | 74.23 |
| Aluminum oxide (WA 6000, manufactured by Fujimi Incorporated) | 211.7 |

TABLE 5

| | Quantity (mass ratio) |
|---|---|
| Phenol EO modified acrylate (M-101A, manufactured by Toa Gosei Co., Ltd.) | 60.0 |
| Epoxy acrylate (SP-1509, manufactured by Showa Highpolymer Co., Ltd.) | 40.0 |
| Photoinitiator (Irgacure 907, manufactured by Ciba Japan) | 2.0 |
| Polyether urethane prepolymer (Takenate L-2760, manufactured by Mitsui Chemicals Polyurethanes, Inc.) | 102.3 |

What is claimed is:

1. A structured abrasive article comprising: an extensible base member; a plurality of three-dimensional elements each including abrasive particles and binder; and a continuous resin layer that directly binds the extensible base member and the plurality of three-dimensional elements; wherein the resin layer forms a film shape and defines a surface side opposite the extensible base member, wherein an entirety of each of the three-dimensional elements is disposed on the surface side such that the resin layer is in continuous contact with each of the plurality of three-dimensional elements; and further wherein the extensible base member includes voids on a surface on a resin layer side of the extensible base member, and the voids are completely filled with a resin that constitutes the resin layer.

2. The structured abrasive article according to claim 1, wherein the resin layer is a layer made from resin without a core material.

3. The structured abrasive article according to claim 1, wherein the resin layer is a layer made from resin having an elastic modulus at 25° C. in a range from $1.0 \times 10^6$ to $1.0 \times 10^8$ Pa.

4. The structured abrasive article according to claim 1, wherein the resin layer is tacky at 25° C.

5. A method of manufacturing a structured abrasive article according to claim 2, comprising:
a filling step of filling a mold having a plurality of depressions with an abrasive material composition including abrasive particles and hardening resin;
a bonding step of bonding on to the surface side of the resin layer the abrasive material composition filled in the mold; and
a hardening step of hardening the abrasive material composition to form on the resin layer the three-dimensional elements including the abrasive particles.

6. A method of manufacturing a structured abrasive article according to claim 1 comprising: an application step of applying a hardening resin composition to one surface of the extensible base member so as to fill the voids; a resin layer forming step of forming the resin layer made from the resin composition by hardening the resin composition applied in the application step; a filling step of filling a mold having a plurality of depressions with an abrasive material composition including abrasive particles and hardening resin; a bonding step of bonding the abrasive material composition with which the mold has been filled on to the surface side of the resin layer; and a hardening step of hardening the abrasive material composition and forming the three-dimensional elements including the abrasive particles on the resin layer.

7. A method of manufacturing a structured abrasive article according to claim 1 comprising: a first filling step of filling an abrasive material composition including abrasive particles and hardening resin into a mold having a plurality of depressions; a second filling step of further filling the mold that has been filled with the abrasive material composition with a hardening resin composition; a bonding step of bonding the resin composition that has been filled in the mold to one surface of the extensible base member, and filling the voids in the extensible base member with the resin composition; and a hardening step of hardening the resin composition and the abrasive material composition, and forming on one surface of the extensible base member the resin layer made from the resin composition and the three-dimensional elements including the abrasive particles.

8. The structured abrasive article according to claim 1, wherein the resin layer has a constant thickness.

9. The structured adhesive article according to claim 1, wherein the resin layer is an acrylic pressure sensitive adhesive.

10. The method of claim 5, wherein prior to the step of bonding, the resin layer is formed along a surface of the extensible base member, and further wherein the step of bonding includes pressing the extensible base member and the resin layer into the mold.

11. The structure abrasive article according to claim 1, wherein the resin comprises polymers of acrylic monomer having a hydroxyl group monomer and urethane prepolymer.

12. The structured abrasive article according to claim 1, wherein the extensible base member is rubber.

13. The structured abrasive article according to claim 1, wherein the extensible base member is a sponge.

14. The method of claim 5, wherein the extensible base member defines a base member surface having a wavy shape, and further wherein the resin layer is formed along the base member surface such that prior to the bonding step, the surface side of the resin layer has the wavy shape of the base member surface, and further wherein the bonding step includes pressing the extensible base member toward the mold to temporarily flatten the base member surface and the surface side, and even further wherein following the bonding step the method further comprising removing the extensible base member away from the mold, and the base member surface and the surface side returning to the wavy shape.

* * * * *